US006894014B2

(12) United States Patent
Deak et al.

(10) Patent No.: US 6,894,014 B2
(45) Date of Patent: May 17, 2005

(54) FABRIC CARE COMPOSITIONS FOR LIPOPHILIC FLUID SYSTEMS

(75) Inventors: John Christopher Deak, Clarks Summit, PA (US); John Christian Haught, West Chester, OH (US); Joseph Michael Ladd, Jr., Cleves, OH (US); John Cort Severns, West Chester, OH (US); Christian Arthur Jacques K. Thoen, West Chester, OH (US); Jerome Howard Collins, Cincinnati, OH (US)

(73) Assignee: Proacter & Gamble Company, Cincinnati, OH (US)

( * ) Notice: Subject to any disclaimer, the term of this patent is extended or adjusted under 35 U.S.C. 154(b) by 299 days.

(21) Appl. No.: 10/177,691

(22) Filed: Jun. 21, 2002

(65) Prior Publication Data

US 2003/0087793 A1 May 8, 2003

Related U.S. Application Data

(60) Provisional application No. 60/300,116, filed on Jun. 22, 2001.

(51) Int. Cl.[7] .............................. C11D 3/43; C11D 9/36
(52) U.S. Cl. ..................... 510/285; 510/289; 510/466; 510/276; 8/142; 8/149.1
(58) Field of Search ................................ 510/289, 285, 510/466, 276; 8/142, 149.1

(56) References Cited

U.S. PATENT DOCUMENTS

| | | |
|---|---|---|
| 4,102,824 A | 7/1978 | Mizutani et al. |
| 4,639,321 A | 1/1987 | Barrat et al. |
| 4,685,930 A | 8/1987 | Kasprzak et al. |
| 4,708,807 A | 11/1987 | Kemerer et al. |
| 5,057,240 A | 10/1991 | Madore et al. |
| 5,705,562 A | 1/1998 | Hill et al. |
| 5,707,613 A | 1/1998 | Hill et al. |
| 5,865,852 A | 2/1999 | Berndt et al. |
| 5,876,510 A | 3/1999 | Kuemin et al. |
| 5,888,250 A | 3/1999 | Hayday et al. |
| 5,942,007 A | 8/1999 | Berndt et al. |
| 5,977,040 A | 11/1999 | Inada et al. |
| 5,985,810 A | 11/1999 | Inada et al. |
| 6,013,683 A | 1/2000 | Hill et al. |
| 6,042,617 A | 3/2000 | Berndt et al. |
| 6,042,618 A | 3/2000 | Berndt et al. |
| 6,056,789 A | 5/2000 | Berndt et al. |
| 6,059,845 A | 5/2000 | Berndt et al. |
| 6,060,546 A | 5/2000 | Powell et al. |
| 6,063,135 A | 5/2000 | Berndt et al. |
| 6,136,766 A | 10/2000 | Inada et al. |
| 6,156,074 A | 12/2000 | Hayday et al. |
| 6,177,399 B1 | 1/2001 | Mei et al. |
| 6,258,130 B1 | 7/2001 | Murphy et al. |
| 6,273,919 B1 | 8/2001 | Hayday et al. |
| 6,309,425 B1 | 10/2001 | Murphy et al. |
| 6,310,029 B1 | 10/2001 | Kilgour et al. |
| 6,313,079 B1 | 11/2001 | Murphy |
| 6,368,359 B1 | 4/2002 | Perry et al. |
| 6,521,580 B2 * | 2/2003 | Perry et al. .................. 510/285 |
| 6,548,465 B2 * | 4/2003 | Perry et al. .................. 510/285 |
| 6,706,076 B2 * | 3/2004 | Deak et al. .................... 8/137 |
| 6,706,677 B2 * | 3/2004 | Burns et al. ................ 510/286 |
| 2001/0020308 A1 | 9/2001 | Murphy et al. |
| 2001/0034912 A1 | 11/2001 | Kilgour et al. |
| 2002/0004953 A1 | 1/2002 | Perry et al. |
| 2002/0115582 A1 | 8/2002 | Perry et al. |
| 2002/0174493 A1 | 11/2002 | Perry et al. |

FOREIGN PATENT DOCUMENTS

| | | |
|---|---|---|
| DE | 37 39 711 A1 | 6/1989 |
| EP | 0982 023 A2 | 3/2000 |
| EP | 1 041 189 A1 | 10/2000 |
| EP | 1 043 443 A1 | 10/2000 |
| EP | 1043443 * | 10/2000 |
| EP | 1092 803 A1 | 4/2001 |
| EP | 1092803 * | 4/2001 |
| JP | 2000-290689 | 10/2000 |
| WO | WO 00/04221 | 1/2000 |
| WO | WO 00/04222 | 1/2000 |
| WO | WO 00/63340 | 10/2000 |
| WO | WO 01/40567 A1 | 6/2001 |
| WO | WO 01/94678 A1 | 12/2001 |
| WO | WO 01/94681 A1 | 12/2001 |
| WO | WO 01/94684 A1 | 12/2001 |
| WO | WO 02/97024 | 5/2002 |
| WO | WO 02/46517 A1 | 6/2002 |
| WO | WO 02/48447 A1 | 6/2002 |
| WO | WO 02/50366 A1 | 6/2002 |
| WO | WO 02/77356 A1 | 10/2002 |

* cited by examiner

*Primary Examiner*—Charles Boyer
(74) *Attorney, Agent, or Firm*—Caroline Wei-Berk; C. Brant Cook; Kim W. Zerby

(57) ABSTRACT

Compositions for treating fabric articles, especially articles of clothing, linens and drapery, wherein the compositions provide improved cleaning of soils from and/or care of and/or treatment of fabric articles, especially while providing superior garment care for articles sensitive to water as compared to conventional fabric article treating compositions, are provided.

54 Claims, No Drawings

FABRIC CARE COMPOSITIONS FOR LIPOPHILIC FLUID SYSTEMS

RELATED APPLICATIONS

This application claims priority to U.S. Provisional Application Ser. No. 60/300,116 filed on Jun. 22, 2001.

FIELD OF THE INVENTION

The present invention relates to compositions for treating fabric articles, especially articles of clothing, linens and drapery, wherein the compositions provide improved cleaning of soils from and/or care of and/or treatment of fabric articles, especially while providing superior garment care for articles sensitive to water as compared to conventional fabric article treating compositions.

BACKGROUND OF THE INVENTION

For the cleaning of fabric articles consumers currently have the choice of conventional laundry cleaning or dry cleaning.

Conventional laundry cleaning is carried out with relatively large amounts of water, typically in a washing machine at the consumer's home, or in a dedicated place such as a coin laundry. Although washing machines and laundry detergents have become quite sophisticated, the conventional laundry process still exposes the fabric articles to a risk of dye transfer and shrinkage. Significant portions of fabric articles used by consumers are not suitable for cleaning in a conventional laundry process. Even fabric articles that are considered "washing machine safe" frequently come out of the laundry process badly wrinkled and require ironing.

Dry cleaning processes rely on non-aqueous solvents for cleaning. By avoiding water these processes minimize the risk of shrinkage and wrinkling; however, cleaning of soils, particularly water-based and alcohol-based soils, is very limited with these processes. Typically, the dry-cleaner removes such soils by hand prior to the dry-cleaning process. These methods are complex, requiring a wide range of compositions to address the variety of stains encountered, very labor intensive and often result in some localized damage to the treated article.

Accordingly there is an unmet need, in commercial laundry, in dry-cleaning and in the home, for fabric article treating compositions, which simultaneously provide acceptable cleaning of across a variety of soils while remaining safe for a wide range of fabric articles.

SUMMARY OF THE INVENTION

The present invention provides compositions which exhibit improved cleaning of soils from and/or care of and/or treatment of fabric articles. These benefits may be delivered to the fabric article treated by the compositions of the present invention while maintaining excellent fabric care properties.

In one aspect of the present invention, a fabric article treating composition comprising:

a) a lipophilic fluid; and
b) a surfactant component capable of enhancing soil removal benefits of a lipophilic fluid and/or capable of suspending water in a lipophilic fluid; and
c) a non-silicone additive capable of further enhancing soil removal by the composition; and
d) optionally, water; and
e) optionally, other cleaning adjuncts; and
f) optionally, processing aids;

wherein the composition is capable of suspending water in a lipophilic fluid, is provided.

In another aspect of the present invention, a consumable detergent composition is provided such that upon dilution with a discrete lipophilic fluid, the aforementioned fabric article treating compositions are achieved. "A discrete lipophilic fluid" as used herein means a lipophilic fluid that is not part of the originally formulated detergent composition.

In yet another aspect of the present invention, a consumable detergent composition comprising:

a) a surfactant component capable of enhancing soil removal benefits of a lipophilic fluid and/or capable of suspending water in a lipophilic fluid; and
b) a non-silicone additive capable of further enhancing soil removal by the composition; and
c) optionally, water; and
d) optionally, other cleaning adjuncts; and
e) optionally lipophilic fluid; and
f) optionally processing aids;

wherein the composition is capable of suspending water in a lipophilic fluid, is provided.

In still yet another aspect of the present invention, a method for preparing a fabric article treating composition in accordance with the present invention from the consumable detergent composition of the present invention by dilution (i.e., mixing) with a discrete lipophilic fluid is provided. The method may comprise the step of agitating the mixture of the consumable detergent composition and the discrete lipophilic fluid.

In still yet another aspect of the present invention, a method for treating fabric articles in need of treatment comprising the steps of:

a) mixing a consumable detergent composition in accordance with the present invention with a discrete lipophilic fluid to form a fabric article treating composition; and
b) contacting the fabric articles with the fabric article treating composition formed in step a)

such that the fabric articles are treated, is provided.

In even yet another aspect of the present invention, a method for treating fabric articles in need of treatment comprising the steps of:

a) contacting the fabric articles with a discrete lipophilic fluid in accordance with the present invention; and
b) contacting the fabric articles with a detergent composition in accordance with the present invention; and
c) optionally, subsequently agitating the fabric articles, is provided. Steps a) and b) can occur in any sequence and/or concurrently.

In even still another aspect of the present invention, a fabric article treated by a method in accordance with the present invention is provided.

In still another aspect of the present invention, a fabric article treating composition produced a method in accordance with the present invention is provided.

These and other aspects, features and advantages will become apparent to those of ordinary skill in the art from a reading of the following detailed description and the appended claims. All percentages, ratios and proportions herein are by weight, unless otherwise specified. All temperatures are in degrees Celsius (° C.) unless otherwise specified. All measurements are in SI units unless otherwise specified. All documents cited are, in relevant part, incorporated herein by reference.

DETAILED DESCRIPTION OF THE INVENTION

Definitions

The term "fabric article" used herein is intended to mean any article that is customarily cleaned in a conventional laundry process or in a dry cleaning process. As such, the term encompasses articles of clothing, linens, drapery, and clothing accessories. The term also encompasses other items made in whole or in part of fabric, such as tote bags, furniture covers, tarpaulins and the like.

The term "lipophilic fluid" used herein is intended to mean any nonaqueous fluid capable of removing sebum, as described in more detail herein below.

The term "fabric article treating composition" used herein is intended to mean any lipophilic fluid-containing composition containing cleaning and/or care additives that comes into direct contact with fabric articles to be cleaned. It should be understood that the term "fabric article treating composition" encompasses uses other than cleaning, such as conditioning and sizing. Furthermore, optional cleaning adjuncts such as additional surfactants other than those surfactants described above, bleaches, and the like may be added to the "fabric article treating composition". That is, cleaning adjuncts may be optionally combined with the lipophilic fluid. These optional cleaning adjuncts are described in more detail hereinbelow. Such cleaning adjuncts may be present in the fabric article treating compositions of the present invention at a level of from about 0.01% to about 10% by weight of the fabric article treating composition.

The term "soil" means any undesirable substance on a fabric article that is desired to be removed. By the terms "water-based" or "hydrophilic" soils is meant that the soil comprised water at the time it first came in contact with the fabric article, or the soil retains a significant portion of water on the fabric article. Examples of water-based soils include, but are not limited to, beverages, many food soils, water soluble dyes, bodily fluids such as sweat, urine or blood, outdoor soils such as grass stains and mud.

The term "capable of suspending water in a lipophilic fluid" means that a material is able to suspend, solvate and/or emulsify water, in a way that the water remains visibly suspended, solvated or emulsified when left undisturbed for a period of at least five minutes after initial mixing of the components. In some examples of compositions in accordance with the present invention, the compositions may be colloidal in nature and/or appear milky. In other examples of compositions in accordance with the present invention, the compositions may be transparent.

The term "insoluble in a lipohilic fluid" means that when added to a lipophilic fluid, a material physically separates from the lipophilic fluid (i.e. settle-out, flocculate, float) within 5 minutes after addition, whereas a material that is "soluble in a lipophilic fluid" does not physically separate from the lipophilic fluid within 5 minutes after addition.

The term "consumable detergent composition" means any detersive composition, that when combined with a discrete lipophilic fluid, results in a fabric article treating composition according to the present invention.

The term "processing aid" refers to any material that renders the consumable detergent composition more suitable for formulation, stability, and/or dilution with a lipophilic fluid to form a fabric article treating composition in accordance with the present invention.

The term "mixing" as used herein means combining two or more materials (i.e., more specifically a discrete lipophilic fluid and a detergent composition in accordance with the present invention) in such a way that a homogeneous mixture or stable dispersion or suspension is formed. Suitable mixing processes are known in the art. Nonlimiting examples of suitable mixing processes include vortex mixing processes and static mixing processes.

Compositions of the Present Invention

The present invention provides compositions which exhibit improved cleaning of soils (i.e., removal and/or reduction of soils) from and/or care of and/or treatment of fabric articles. These benefits may be delivered to the fabric article treated by the compositions of the present invention while maintaining excellent fabric care properties. while maintaining excellent fabric care properties.

Lipophilic Fluid

The lipophilic fluid herein is one having a liquid phase present under operating conditions of a fabric article treating appliance, in other words, during treatment of a fabric article in accordance with the present invention. In general such a lipophilic fluid can be fully liquid at ambient temperature and pressure, can be an easily melted solid, e.g., one which becomes liquid at temperatures in the range from about 0 deg. C. to about 60 deg. C., or can comprise a mixture of liquid and vapor phases at ambient temperatures and pressures, e.g., at 25 deg. C. and 1 atm. pressure. Thus, the lipophilic fluid is not a compressible gas such as carbon dioxide.

It is preferred that the lipophilic fluids herein be nonflammable or have relatively high flash points and/or low VOC (volatile organic compound) characteristics, these terms having their conventional meanings as used in the dry cleaning industry, to equal or, preferably, exceed the characteristics of known conventional dry cleaning fluids.

Moreover, suitable lipophilic fluids herein are readily flowable and nonviscous.

In general, lipophilic fluids herein are required to be fluids capable of at least partially dissolving sebum or body soil as defined in the test hereinafter. Mixtures of lipophilic fluid are also suitable, and provided that the requirements of the Lipophilic Fluid Test, as described below, are met, the lipophilic fluid can include any fraction of dry-cleaning solvents, especially newer types including fluorinated solvents, or perfluorinated amines. Some perfluorinated amines such as perfluorotributylamines while unsuitable for use as lipophilic fluid may be present as one of many possible adjuncts present in the lipophilic fluid-containing composition.

Other suitable lipophilic fluids include, but are not limited to, diol solvent systems e.g., higher diols such as C6- or C8- or higher diols, organosilicone solvents including both cyclic and acyclic types, and the like, and mixtures thereof.

A preferred group of nonaqueous lipophilic fluids suitable for incorporation as a major component of the compositions of the present invention include low-volatility nonfluorinated organics, silicones, especially those other than amino functional silicones, and mixtures thereof. Low volatility nonfluorinated organics include for example OLEAN® and other polyol esters, or certain relatively nonvolatile biodegradable mid-chain branched petroleum fractions.

Another preferred group of nonaqueous lipophilic fluids suitable for incorporation as a major component of the compositions of the present invention include, but are not limited to, glycol ethers, for example propylene glycol methyl ether, propylene glycol n-propyl ether, propylene glycol t-butyl ether, propylene glycol n-butyl ether, dipropylene glycol methyl ether, dipropylene glycol n-propyl ether, dipropylene glycol t-butyl ether, dipropylene glycol n-butyl ether, tripropylene glycol methyl ether, tripropylene glycol n-propyl ether, tripropylene glycol t-butyl ether, tripropylene glycol n-butyl ether. Suitable silicones for use as a major component, e.g., more than 50%, of the composition include cyclopentasiloxanes, sometimes termed "D5", and/or linear analogs having approximately similar volatility, optionally complemented by other compatible silicones. Suitable silicones are well known in the literature, see, for example, Kirk Othmer's Encyclopedia of Chemical Technology, and are available from a number of commercial sources, including General Electric, Toshiba Silicone, Bayer, and Dow Corning. Other suitable lipophilic fluids are commercially available from Procter & Gamble or from Dow Chemical and other suppliers.

Qualification of Lipophilic Fluid and Lipophilic Fluid Test (LF Test)

Any nonaqueous fluid that is both capable of meeting known requirements for a dry-cleaning fluid (e.g, flash point etc.) and is capable of at least partially dissolving sebum, as indicated by the test method described below, is suitable as a lipophilic fluid herein. As a general guideline, perfluorobutylamine (Fluorinert FC-43®) on its own (with or without adjuncts) is a reference material which by definition is unsuitable as a lipophilic fluid for use herein (it is essentially a nonsolvent) while cyclopentasiloxanes have suitable sebum-dissolving properties and dissolves sebum.

The following is the method for investigating and qualifying other materials, e.g., other low-viscosity, free-flowing silicones, for use as the lipophilic fluid. The method uses commercially available Crisco® canola oil, oleic acid (95% pure, available from Sigma Aldrich Co.) and squalene (99% pure, available from J. T. Baker) as model soils for sebum. The test materials should be substantially anhydrous and free from any added adjuncts, or other materials during evaluation.

Prepare three vials, each vial will contain one type of lipophilic soil. Place 1.0 g of canola oil in the first; in a second vial place 1.0 g of the oleic acid (95%), and in a third and final vial place 1.0 g of the squalene (99.9%). To each vial add 1 g of the fluid to be tested for lipophilicity. Separately mix at room temperature and pressure each vial containing the lipophilic soil and the fluid to be tested for 20 seconds on a standard vortex mixer at maximum setting. Place vials on the bench and allow to settle for 15 minutes at room temperature and pressure. If, upon standing, a clear single phase is formed in any of the vials containing lipophilic soils, then the nonaqueous fluid qualifies as suitable for use as a "lipophilic fluid" in accordance with the present invention. However, if two or more separate layers are formed in all three vials, then the amount of nonaqueous fluid dissolved in the oil phase will need to be further determined before rejecting or accepting the nonaqueous fluid as qualified.

In such a case, with a syringe, carefully extract a 200-microliter sample from each layer in each vial. The syringe-extracted layer samples are placed in GC auto sampler vials and subjected to conventional GC analysis after determining the retention time of calibration samples of each of the three models soils and the fluid being tested. If more than 1% of the test fluid by GC, preferably greater, is found to be present in any one of the layers which consists of the oleic acid, canola oil or squalene layer, then the test fluid is also qualified for use as a lipophilic fluid. If needed, the method can be further calibrated using heptacosafluorotributylamine, i.e., Fluorinert FC-43 (fail) and cyclopentasiloxane (pass). A suitable GC is a Hewlett Packard Gas Chromatograph HP5890 Series II equipped with a split/splitless injector and FID. A suitable column used in determining the amount of lipophilic fluid present is a J&W Scientific capillary column DB-1HT, 30 meter, 0.25mm id, 0.1 um film thickness cat# 1221131. The GC is suitably operated under the following conditions:

Carrier Gas: Hydrogen

Column Head Pressure: 9 psi

Flows: Column Flow @~1.5 ml/min.
   Split Vent @~250–500 ml/min.
   Septum Purge @1 ml/min.

Injection: HP 7673 Autosampler, 10 ul syringe, 1 ul injection

Injector Temperature: 350° C.

Detector Temperature: 380° C.

Oven Temperature Program: initial 60° C. hold 1 min.
   rate 25° C./min.
   final 380° C. hold 30 min.

Preferred lipophilic fluids suitable for use herein can further be qualified for use on the basis of having an excellent garment care profile. Garment care profile testing is well known in the art and involves testing a fluid to be qualified using a wide range of garment or fabric article components, including fabrics, threads and elastics used in seams, etc., and a range of buttons. Preferred lipophilic fluids for use herein have an excellent garment care profile, for example they have a good shrinkage and/or fabric puckering profile and do not appreciably damage plastic buttons. Certain materials which in sebum removal qualify for use as lipophilic fluids, for example ethyl lactate, can be quite objectionable in their tendency to dissolve buttons, and if such a material is to be used in the compositions of the present invention, it will be formulated with water and/or other solvents such that the overall mix is not substantially damaging to buttons. Other lipophilic fluids, D5, for example, meet the garment care requirements quite admirably. Some suitable lipophilic fluids may be found in granted U.S. Pat. Nos. 5,865,852; 5,942,007; 6,042,617; 6,042,618; 6,056,789; 6,059,845; and 6,063,135, which are incorporated herein by reference.

Lipophilic fluids can include linear and cyclic polysiloxanes, hydrocarbons and chlorinated hydrocarbons, with the exception of PERC which is explicitly not covered by the lipophilic fluid definition as used herein. (Specifically call out DF2000 and PERC). More preferred are the linear and cyclic polysiloxanes and hydrocarbons of the glycol ether, acetate ester, lactate ester families. Preferred lipophilic fluids include cyclic siloxanes having a boiling point at 760 mm Hg. of below about 250° C. Specifically preferred cyclic siloxanes for use in this invention are octamethylcyclotetrasiloxane, decamethylcyclopentasiloxane, and dodecamethylcyclohexasiloxane. Preferably, the cyclic siloxane comprises decamethylcyclopentasiloxane (D5, pentamer) and is substantially free of octamethylcyclotetrasiloxane (tetramer) and dodecamethylcyclohexasiloxane (hexamer).

However, it should be understood that useful cyclic siloxane mixtures might contain, in addition to the preferred cyclic siloxanes, minor amounts of other cyclic siloxanes including octamethylcyclotetrasiloxane and hexamethylcyclotrisiloxane or higher cyclics such as tetradecamethylcycloheptasiloxane. Generally the amount of these other cyclic siloxanes in useful cyclic siloxane mixtures will be less than about 10 percent based on the total weight of the mixture. The industry standard for cyclic siloxane mixtures is that such mixtures comprise less than about 1% by weight of the mixture of octamethylcyclotetrasiloxane.

Accordingly, the lipophilic fluid of the present invention preferably comprises more than about 50%, more preferably more than about 75%, even more preferably at least about 90%, most preferably at least about 95% by weight of the lipophilic fluid of decamethylcyclopentasiloxane. Alternatively, the lipophilic fluid may comprise siloxanes which are a mixture of cyclic siloxanes having more than about 50%, preferably more than about 75%, more preferably at least about 90%, most preferably at least about 95% up to about 100% by weight of the mixture of decamethylcyclopentasiloxane and less than about 10%, preferably less than about 5%, more preferably less than about 2%, even more preferably less than about 1%, most preferably less than about 0.5% to about 0% by weight of the mixture of octamethylcyclotetrasiloxane and/or dodecamethylcyclohexasiloxane.

The level of lipophilic fluid, when present in the fabric article treating compositions according to the present invention, is preferably from about 70% to about 99.99%, more preferably from about 90% to about 99.9%, and even more preferably from about 95% to about 99.8% by weight of the fabric article treating composition.

The level of lipophilic fluid, when present in the consumable detergent compositions according to the present invention, is preferably from about 0.1% to about 90%, more preferably from about 0.5% to about 75%, and even more preferably from about 1% to about 50% by weight of the consumable detergent composition.

Surfactant Component

The surfactant component of the present invention can be a material that is capable of suspending water in a lipophilic fluid and/or enhancing soil removal benefits of a lipophilic fluid. The materials may be soluble in the lipophilic fluid.

One class of materials can include siloxane-based surfactants (siloxane-based materials). The siloxane-based surfactants in this application may be siloxane polymers for other applications. The siloxane-based surfactants typically have a weight average molecular weight from 500 to 20,000. Such materials, derived from poly(dimethylsiloxane), are well known in the art. In the present invention, not all such siloxane-based surfactants are suitable, because they do not provide improved cleaning of soils compared to the level of cleaning provided by the lipophilic fluid itself.

Suitable siloxane-based surfactants comprise a polyether siloxane having the formula:

$M_a D_b D'_c D''_d M'_{2-a}$ wherein a is 0–2; b is 0–1000; c is 0–50; d is 0–50, provided that a+c+d is at least 1;

M is $R^1_{3-e}X_e SiO_{1/2}$ wherein $R^1$ is independently H, or a monovalent hydrocarbon group, X is hydroxyl group, and e is 0 or 1;

M' is $R^2_3 SiO_{1/2}$ wherein $R^2$ is independently H, a monovalent hydrocarbon group, or $(CH_2)_f$—$(C6H4)_g O$—$(C_2H_4O)_h$—$(C_3H_6O)_i$—$(C_kH_{2k}O)_j$—$R^3$, provided that at least one $R^2$ is $(CH_2)_f$—$(C6H4)_g O$—$(C_2H_4O)_h$—$(C_3H_6O)_i$—$(C_kH_{2k}O)_j$—$R^3$, wherein $R^3$ is independently H, a monovalent hydrocarbon group or an alkoxy group, f is 1–10, g is 0 or 1, h is 1–50, i is 0–50, j is 0–50, k is 4–8;

D is $R^4_2 SiO_{2/2}$ wherein $R^4$ is independently H or a monovalent hydrocarbon group;

D' is $R^5_2 SiO_{2/2}$ wherein $R^5$ is independently $R^2$ provided that at least one $R^5$ is $(CH_2)_f$—$(C6H4)_g O$—$(C_2H_4O)_h$—$(C_3H_6O)_i$—$(C_kH_{2k}O)_j$—$R^3$, wherein $R^3$ is independently H, a monovalent hydrocarbon group or an alkoxy group, f is 1–10, g is 0 or 1, h is 1–50, i is 0–50, j is 0–50, k is 4–8; and D" is $R^6_2 SiO_{2/2}$ wherein $R^6$ is independently H, a monovalent hydrocarbon group or $(CH_2)_f(C_6H_4)_m (A)_n$-$[(L)_o$-$(A')_p$-$]_q$-$(L')_r Z(G)_s$, wherein l is 1–10; m is 0 or 1; n is 0–5; o is 0–3; p is 0 or 1; q is 0–10; r is 0–3; s is 0–3; $C_6H_4$ is unsubstituted or substituted with a $C_{1-10}$ alkyl or alkenyl; A and A' are each independently a linking moiety representing an ester, a keto, an ether, a thio, an amido, an amino, a $C_{1-4}$ fluoroalkyl, a $C_{1-4}$ fluoroalkenyl, a branched or straight chained polyalkylene oxide, a phosphate, a sulfonyl, a sulfate, an ammonium, and mixtures thereof; L and L' are each independently a $C_{1-30}$ straight chained or branched alkyl or alkenyl or an aryl which is unsubstituted or substituted; Z is a hydrogen, carboxylic acid, a hydroxy, a phosphato, a phosphate ester, a sulfonyl, a sulfonate, a sulfate, a branched or straight-chained polyalkylene oxide, a nitryl, a glyceryl, an aryl unsubstituted or substituted with a $C_{1-30}$ alkyl or alkenyl, a carbohydrate unsubstituted or substituted with a $C_{1-10}$ alkyl or alkenyl or an ammonium; G is an anion or cation such as $H^+$, $Na^+$, $Li^+$, $K^+$, $NH_4^+$, $Ca^{+2}$, $Mg^{+2}$, $Cl^-$, $Br^-$, $I^-$, mesylate or tosylate.

Examples of the types of siloxane-based surfactants described herein above may be found in EP-1,043,443A1, EP-1,041,189 and WO-01/34,706 (all to GE Silicones) and U.S. Pat. No. 5,676,705, U.S. Pat. No. 5,683,977, U.S. Pat. No. 5,683,473, and EP-1,092,803A1 (all to Lever Brothers).

Nonlimiting commercially available examples of suitable siloxane-based surfactants are TSF 4446 (ex. General Electric Silicones), XS69-B5476 (ex. General Electric Silicones); Jenamine HSX (ex. DelCon) and Y12147 (ex. OSi Specialties).

A second preferred class of materials suitable for the surfactant component is organic in nature. Preferred materials are organosulfosuccinate surfactants, with carbon chains of from about 6 to about 20 carbon atoms. Most preferred are organosulfosuccinates containing dialkly chains, each with carbon chains of from about 6 to about 20 carbon atoms. Also preferred are chains containing aryl or alkyl aryl, substituted or unsubstituted, branched or linear, saturated or unsaturated groups.

Nonlimiting commercially available examples of suitable organosulfosuccinate surfactants are available under the trade names of Aerosol OT and Aerosol TR-70 (ex. Cytec).

The surfactant component, when present in the fabric article treating compositions of the present invention, preferably comprises from about 0.01% to about 10%, more preferably from about 0.02% to about 5%, even more preferably from about 0.05% to about 2% by weight of the fabric article treating composition.

The surfactant component, when present in the consumable detergent compositions of the present invention, preferably comprises from about 1% to about 99%, more preferably 2% to about 75%, even more preferably from about 5% to about 60% by weight of the consumable detergent composition.

Non-Silicone Additive

The non-silicone additive (i.e., materials do not contain an Si atom), which preferably comprises a strongly polar and/or hydrogen-bonding head group, further enhances soil removal by the compositions of the present invention. Examples of the strongly polar and/or hydrogen-bonding head group-containing materials include, but are not limited to alcohols, cationic materials such as cationic surfactants, quaternary surfactants, quaternary ammonium salts such as ammonium chlorides (nonlimiting examples of ammonium chlorides are Arquad materials commercially available from Akzo Nobel) and cationic fabric softening actives, nonionic materials such as nonionic surfactants (i.e., alcohol ethoxylates, polyhydroxy fatty acid amides), gemini surfactants, anionic surfactants, zwitterionic surfactants, carboxylic acids, sulfates, sulphonates, phosphates, phosphonates, and nitrogen containing materials. In one embodiment, non-silicone additives comprise nitrogen containing materials selected from the group consisting of primary, secondary and tertiary amines, diamines, triamines, ethoxylated amines, amine oxides, amides and betaines, a nonlimiting example of a betaines is Schercotaine materials commercially available from Scher Chemicals and mixtures thereof.

In another embodiment embodiment, alkyl chain contains branching that may help lower the melting point.

In yet another embodiment, primary alkylamines comprising from about 6 to about 22 carbon atoms are used. Particularly preferred primary alkylamines are oleylamine (commercially available from Akzo under the trade name Armeen OLD), dodecylamine (commercially available from Akzo under the trade name Armeen 12D), branched $C_{16}$–$C_{22}$ alkylamine (commercially available from Rohm & Haas under the trade name Primene JM-T) and mixtures thereof.

Suitable cationic materials may include quaternary surfactants, which maybe quaternary ammonium compounds. Commercially available agents include Varisoft materials from Goldschmidt.

Additional suitable cationic materials may include conventional fabric softening actives. Nonlimiting examples of suitable fabric softening actives of the invention comprise a majority of compounds as follows:

Diester Quaternary Ammonium Fabric Softening Active Compound (DEQA)

(1) The first type of DEQA preferably comprises, as the principal active, compounds of the formula

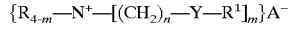

wherein each R substituent is either hydrogen, a short chain $C_1$–$C_6$, preferably $C_1$–$C_3$ alkyl or hydroxyalkyl group, e.g., methyl (most preferred), ethyl, propyl, hydroxyethyl, and the like, poly ($C_{2-3}$ alkoxy) preferably polyethoxy group, benzyl, or mixtures thereof; each m is 2 or 3; each n is from 1 to about 4; each Y is —O—(O)C—, —C(O)—O—, —NR—C(O)—, or —C(O)—NR—; the sum of carbons in each $R^1$, plus one when Y is —O—(O)C— or —NR—C(O)—, is $C_{12}$–$C_{22}$, preferably $C_{14}$–$C_{20}$, with each $R^1$ being a hydrocarbyl, or substituted hydrocarbyl group, and $A^-$ can be any softener-compatible anion, preferably, chloride, bromide, methylsulfate, ethylsulfate, sulfate, and nitrate, more preferably chloride or methyl sulfate. (As used herein, the "percent of softening active" containing a given $R^1$ group is based upon taking a percentage of the total active based upon the percentage that the given $R^1$ group is, of the total $R^1$ groups present.)

(2) A second type of DEQA active has the general formula:

wherein each Y, R, $R^1$, and $A^-$ have the same meanings as before. Such compounds include those having the formula:

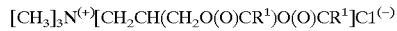

where each R is a methyl or ethyl group and preferably each $R^1$ is in the range of $C_{15}$ to $C_{19}$.

(3) The DEQA actives described hereinabove also include the neutralized amine softening actives wherein at least one R group is a hydrogen atom. A non-limiting example of actives of this type is the chloride salt of (unsaturated alkoyloxyethyl)(unsaturated alkylamidotrimethylene) methylamine. Other examples of suitable amine softening actives are disclosed in PCT application WO 99/06509, K. A. Grimm, D. R. Bacon, T. Trinh, E. H. Wahl, and H. B. Tordil, published on Feb. 11, 1999, said application being incorporated herein by reference.

(4) Polyquaternary Ammonium Softening Actives. Fabric softening actives carrying more than one positive quaternary ammonium charge are also useful in the rinse-added compositions of the present invention. An example of this type of softening active is that having the formula:

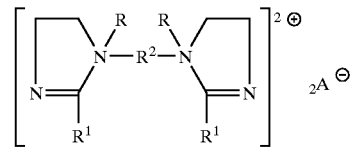

wherein each R is H or a short chain $C_1$–$C_6$, preferably $C_1$–$C_3$ alkyl or hydroxyalkyl group, e.g., methyl (most preferred), ethyl, propyl, hydroxyethyl, and the like, benzyl, or $(R^2 O)_{2-4}H$; each $R^1$ is a $C_6$–$C_{22}$, preferably $C_{14}$–$C_{20}$ hydrocarbyl, or substituted hydrocarbyl substituent, preferably $C_{10}$–$C_{20}$ alkyl or alkenyl (unsaturated alkyl, including polyunsaturated alkyl, also referred to sometimes as "alkylene"), most preferably $C_{12}$–$C_{18}$ alkyl or alkenyl; each $R^2$ is a $C_{1-6}$ alkylene group, preferably an ethylene group; and $A^-$ are defined as below. Fabric softening actives having the following formula:

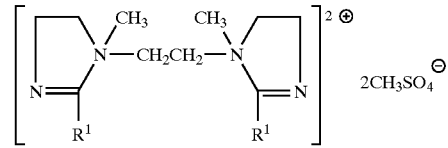

wherein $R^1$ is derived from oleic acid is available from Witco Company.

(5) Softening active having the formula:

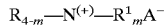

wherein each m is 2 or 3, each $R^1$ is a $C_6$–$C_{22}$, preferably $C_{14}$–$C_{20}$, but no more than one being less than about $C_{12}$ and then the other is at least about 16, hydrocarbyl, or substituted hydrocarbyl substituent, preferably $C_{10}$–$C_{20}$ alkyl or alkenyl, most preferably $C_{12}$–$C_{18}$ alkyl or alkenyl, and where the Iodine Value of a fatty acid containing this $R^1$ group is from 0 to about 140, more preferably from about 40 to about 130; with a cis/trans ratio of from about 1:1 to about 50:1, the minimum being 1:1, preferably from about 2:1 to about 40:1, more preferably from about 3:1 to about 30:1, and even more preferably from about 4:1 to about 20:1; each $R^1$ can also be a branched chain $C_{14}$–$C_{22}$ alkyl group, preferably a branched chain $C_{16}$–$C_{18}$ group; each R is H or a short chain $C_1$–$C_6$, preferably $C_1$–$C_3$ alkyl or hydroxyalkyl group, e.g., methyl (most preferred), ethyl, propyl, hydroxyethyl, and the like, benzyl, or $(R^2 O)_{2-4}H$; and $A^-$ is a softening active compatible anion, preferably, chloride, bromide, methylsulfate, ethylsulfate, sulfate, and nitrate, more preferably chloride and methyl sulfate;

(6) Softening active having the formula:

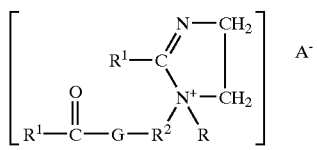

wherein each R, $R^1$, and $A^-$ have the definitions given above; each $R^2$ is a $C_{1-6}$ alkylene group, preferably an ethylene group; and G is an oxygen atom or an —NR— group;

(7) Softening active having the formula:

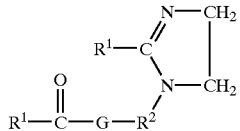

wherein $R^1$, $R^2$ and G are defined as above in (6);

(8) Reaction products of substantially unsaturated and/or branched chain higher fatty acids with dialkylenetriamines in, e.g., a molecular ratio of about 2:1, said reaction products containing compounds of the formula:

wherein $R^1$, $R^2$ are defined as above in (6), and each $R^3$ is a $C_{1-6}$ alkylene group, preferably an ethylene group;

(9) Softening active having the formula:

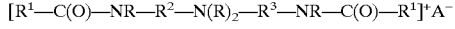

wherein R, $R^1$, $R^2$, $R^3$ and $A^-$ are defined as above in (6) and (8);

(10) The reaction product of substantially unsaturated and/or branched chain higher fatty acid with hydroxyalkylalkylenediamines in a molecular ratio of about 2:1, said reaction products containing compounds of the formula:

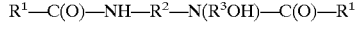

wherein $R^1$, $R^2$ and $R^3$ are defined as above in (8); and

(11) Mixtures thereof.

Examples of Compound (5) are dialkylenedimethylammonium salts such as dicanoladimethylammonium chloride, dicanoladimethylammonium methylsulfate, di(partially hydrogenated soybean, cis/trans ratio of about 4:1) dimethylammonium chloride, dioleyldimethylammonium chloride. Dioleyldimethylammonium chloride and di(canola)dimethylammonium chloride are preferred. An example of commercially available dialkylenedimethylammonium salts usable in the present invention is dioleyldimethylammonium chloride available from Witco Corporation under the trade name Adogen® 472.

An example of Compound (6) is 1-methyl-1-oleylamidoethyl-2-oleylimidazolinium methylsulfate wherein $R^1$ is an acyclic aliphatic $C_{15}$–$C_{17}$ hydrocarbon group, $R^2$ is an ethylene group, G is a NH group, $R^5$ is a methyl group and $A^-$ is a methyl sulfate anion, available commercially from the Witco Corporation under the trade name Varisoft® 3690.

An example of Compound (7) is 1-oleylamidoethyl-2-oleylimidazoline wherein $R^1$ is an acyclic aliphatic $C_{15}$–$C_{17}$ hydrocarbon group, $R^2$ is an ethylene group, and G is a NH group.

An example of Compound (8) is reaction products of oleic acids with diethylenetriamine in a molecular ratio of about 2:1, said reaction product mixture containing N,N"-dioleoyldiethylenetriamine with the formula:

wherein $R^1$—C(O) is oleoyl group of a commercially available oleic acid derived from a vegetable or animal source, such as Emersol® 223LL or Emersol® 7021, available from Henkel Corporation, and $R^2$ and $R^3$ are divalent ethylene groups.

An example of Compound (9) is a difatty amidoamine based softening active having the formula:

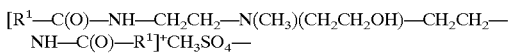

wherein $R^1$—C(O) is oleoyl group, available commercially from the Witco Corporation under the trade name Varisoft® 222LT.

An example of Compound (10) is reaction products of oleic acids with N-2-hydroxyethylethylenediamine in a molecular ratio of about 2:1, said reaction product mixture containing a compound of the formula:

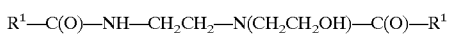

wherein $R^1$—C(O) is oleoyl group of a commercially available oleic acid derived from a vegetable or animal source, such as Emersol® 223LL or Emersol® 7021, available from Henkel Corporation.

The above individual Compounds (actives) can be used individually or as mixtures.

One type of optional but highly desirable cationic compound which can be used in combination with the above softening actives are compounds containing one long chain acyclic $C_8$–$C_{22}$ hydrocarbon group, selected from the group consisting of: wherein $R^7$ is hydrogen or a $C_1$–$C_4$ saturated alkyl or hydroxyalkyl group, and $R^1$ and $A^-$ are defined as herein above;

(12) Acyclic quaternary ammonium salts having the formula:

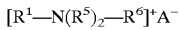

wherein $R^5$ and $R^6$ are $C_1$–$C_4$ alkyl or hydroxyalkyl groups, and $R^1$ and $A^-$ are defined as hereinabove in (9);

(13) Substituted imidazolinium salts having the formula:

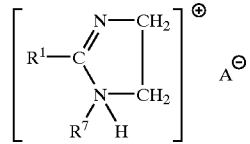

wherein $R^7$ is hydrogen or a $C_1$–$C_4$ saturated alkyl or hydroxyalkyl group, and $R^1$ and $A^-$ are defined as hereinabove in (9);

(14) Substituted imidazolinium salts having the formula:

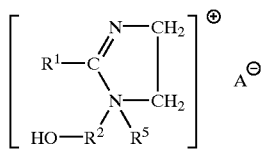

wherein $R^5$ is a $C_1$–$C_4$ alkyl or hydroxyalkyl group, and $R^1$, $R^2$, and $A^-$ are as defined above in (9);

(15) Alkylpyridinium salts having the formula:

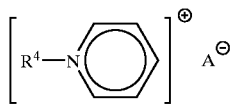

wherein $R^4$ is an acyclic aliphatic $C_8$–$C_{22}$ hydrocarbon group and $A^-$ is an anion;

(16) Alkanamide alkylene pyridinium salts having the formula:

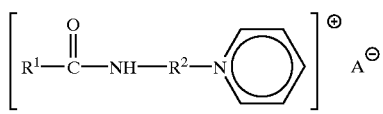

wherein $R^1$, $R^2$ and $A^-$ are defined as herein above; and

(17) Monoalkyl diquaternary salts, e.g., that having the formula:

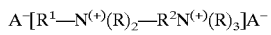

wherein R, $R^1$, $R^2$ and $A^-$ are defined as herein above in (6) and (9); and

(18) Mixtures thereof.

Examples of Compound (12) are the monoalkenyltrimethylammonium salts such as monooleyltrimethylammonium chloride, monocanolatrimethylammonium chloride, and soyatrimethylammonium chloride. Monooleyltrimethylammonium chloride and monocanolatrimethylammonium chloride are preferred. Other examples of Compound (12) are soyatrimethylammonium chloride available from Witco Corporation under the trade name Adogen® 415, erucyltrimethylammonium chloride wherein $R^1$ is a $C_{22}$ hydrocarbon group derived from a natural source; soyadimethylethylammonium ethylsulfate wherein $R^1$ is a $C_{16}$–$C_{18}$ hydrocarbon group, $R^5$ is a methyl group, $R^6$ is an ethyl group, and $A^-$ is an ethylsulfate anion; and methyl bis(2-hydroxyethyl) oleylammonium chloride wherein $R^1$ is a $C_{18}$ hydrocarbon group, $R^5$ is a 2-hydroxyethyl group and $R^6$ is a methyl group.

An example of Compound (14) is 1-ethyl-1-(2-hydroxyethyl)-2-isoheptadecylimidazolinium ethylsulfate wherein $R^1$ is a $C_{17}$ hydrocarbon group, $R^2$ is an ethylene group, $R^5$ is an ethyl group, and $A^-$ is an ethylsulfate anion.

An example of Compound (17) is N-tallow pentamethyl propane diammonium dichloride, with the formula:

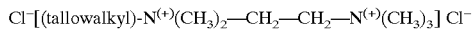

available from Witco Corporation under the trade name Adogen® 477.

In the cationic nitrogenous salts herein, the anion $A^-$, which is any softening active compatible anion, provides electrical neutrality. Most often, the anion used to provide electrical neutrality in these salts is from a strong acid, especially a halide, such as chloride, methylsulfate, bromide, or iodide. However, other anions can be used, such as ethylsulfate, acetate, formate, sulfate, carbonate, and the like. Chloride and methylsulfate are preferred herein as anion A.

Suitable cationic surfactants include, but are not limited to dialkyldimethylammonium salts having the formula:

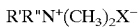

wherein each R' and R'' is independently selected from the group consisting of 12–30 C atoms or derived from tallow, coconut oil or soy, X=Cl or Br, Nonlimiting examples include: didodecyldimethylammonium bromide (DDAB), dihexadecyldimethyl ammonium chloride, dihexadecyldimethyl ammonium bromide, dioctadecyldimethyl ammonium chloride, dieicosyldimethyl ammonium chloride, didocosyldimethyl ammonium chloride, dicoconutdimethyl ammonium chloride, ditallowdimethyl ammonium bromide (DTAB). Commercially available examples include, but are not limited to: ADOGEN, ARQUAD, TOMAH, VARIQUAT.

In one embodiment, the cationic surfactants comprise the water-soluble quaternary ammonium compounds useful in the present composition having the formula:

wherein $R_1$ is $C_8$–$C_{16}$ alkyl, each of $R_2$, $R_3$ and $R_4$ is independently $C_1$–$C_4$ alkyl, $C_1$–$C_4$ hydroxy alkyl, benzyl, and —$(C_2H_{40})_x$H where x has a value from 2 to 5, and X is an anion. Not more than one of $R_2$, $R_3$ or $R_4$ should be benzyl.

The typical cationic fabric softening compounds include the water-insoluble quaternary-ammonium fabric softening actives, the most commonly used having been di(long alkylchain)dimethylammonium (C1–C4 alkyl)sulfate or chloride, preferably the methyl sulfate, compounds including the following:

1) di(tallowalkyl)dimethylammonium methyl sulfate (DTDMAMS);
2) di(hydrogenated tallowalkyl)dimethylammonium methyl sulfate;
3) di(hydrogenated tallowalkyl)dimethylammonium chloride (DTDMAC);
4) distearyldimethylammonium methyl sulfate;
5) dioleyldimethylammonium methyl sulfate;
6) dipalmitylhydroxyethylmethylammonium methyl sulfate;
7) stearylbenzyldimethylammonium methyl sulfate;
8) tallowalkyltrimethylammonium methyl sulfate;
9) (hydrogenated tallowalkyl)trimethylammonium methyl sulfate;
10) ($C_{12-14}$ alkyl)hydroxyethyldimethylammonium methyl sulfate;
11) ($C_{12-18}$ alkyl)di(hydroxyethyl)methylammonium methyl sulfate;
12) di(stearoyloxyethyl)dimethylammonium chloride;
13) di(tallowoyloxyethyl)dimethylammonium methyl sulfate;
14) ditallowalkylimidazolinium methyl sulfate;
15) 1-(2-tallowylamidoethyl)-2-tallowylimidazolinium methyl sulfate; and
16) mixtures thereof.

Suitable nonionic surfactants include, but are not limited to:

a) Polyethylene oxide condensates of nonyl phenol and myristyl alcohol, such as in U.S. Pat. No. 4,685,930 Kasprzak; and b) fatty alcohol ethoxylates, R—(OCH$_2$CH$_2$)$_a$OH a=1 to 100, typically 12–40, R=hydrocarbon residue 8 to 20 C atoms, typically linear alkyl. Examples polyoxyethylene lauryl ether, with 4 or 23 oxyethylene groups; polyoxyethylene cetyl ether with 2, 10 or 20 oxyethylene groups; polyoxyethylene stearyl ether, with 2, 10, 20, 21 or 100 oxyethylene groups; polyoxyethylene (2), (10) oleyl ether, with 2 or 10 oxyethylene groups. Commercially available examples include, but are not limited to: ALFONIC, BRIJ, GENAPOL, NEODOL, SURFONIC, TRYCOL.

Nonlimiting examples of ethoxylated materials, such as ethoxylated surfactants include compounds having the general formula:

$$R^8\text{-}Z\text{-}(CH_2CH_2O)_sB$$

wherein $R^8$ is an alkyl group or an alkyl aryl group, selected from the group consisting of primary, secondary and branched chain alkyl hydrocarbyl groups, primary, secondary and branched chain alkenyl hydrocarbyl groups, and/or primary, secondary and branched chain alkyl-and alkenyl-substituted phenolic hydrocarbyl groups having from about 6 to about 20 carbon atoms, preferably from about 8 to about 18, more preferably from about 10 to about 15 carbon atoms; s is an integer from about 2 to about 45, preferably from about 2 to about 20, more preferably from about 2 to about 15; B is a hydrogen, a carboxylate group, or a sulfate group; and linking group Z is —O—, —C(O)O—, —C(O)N(R)—, or —C(O)N(R)—, and mixtures thereof, in which R, when present, is $R^8$ or hydrogen.

The nonionic surfactants herein are characterized by an HLB (hydrophilic-lipophilic balance) of from 5 to 20, preferably from 6 to 15.

Nonlimiting examples of preferred ethoxylated surfactant are:

straight-chain, primary alcohol ethoxylates, with $R^8$ being $C_8$–$C_{18}$ alkyl and/or alkenyl group, more preferably $C_{10}$–$C_{14}$, and s being from about 2 to about 8, preferably from about 2 to about 6;

straight-chain, secondary alcohol ethoxylates, with $R^8$ being $C_8$–$C_{18}$ alkyl and/or alkenyl, e.g., 3-hexadecyl, 2-octadecyl, 4-eicosanyl, and 5-eicosanyl, and s being from about 2 to about 10;

alkyl phenol ethoxylates wherein the alkyl phenols having an alkyl or alkenyl group containing from 3 to 20 carbon atoms in a primary, secondary or branched chain configuration, preferably from 6 to 12 carbon atoms, and s is from about 2 to about 12, preferably from about 2 to about 8;

branched chain alcohol ethoxylates, wherein branched chain primary and secondary alcohols (or Guerbet alcohols) which are available, e.g., from the well-known "OXO" process or modification thereof are ethoxylated.

Especially preferred are alkyl ethoxylate surfactants with each $R^8$ being $C_8$–$C_{16}$ straight chain and/or branch chain alkyl and the number of ethyleneoxy groups s being from about 2 to about 6, preferably from about 2 to about 4, more preferably with $R^8$ being $C_8$–$C_{15}$ alkyl and s being from about 2.25 to about 3.5. These nonionic surfactants are characterized by an HLB of from 6 to about 11, preferably from about 6.5 to about 9.5, and more preferably from about 7 to about 9. Nonlimiting examples of commercially available preferred surfactants are Neodol 91-2.5 ($C_9$–$C_{10}$, s=2.7, HLB=8.5), Neodol 23-3 ($C_{12}$–$C_{13}$, s=2.9, HLB=7.9) and Neodol 25-3 ($C_{12}$–$C_{15}$, s=2.8, HLB=7.5).

Further nonlimiting examples include nonionic surfactants selected from the group consisting of fatty acid ($C_{12\text{-}18}$) esters of ethoxylated (EO$_{5\text{-}100}$) sorbitans. More preferably said surfactant is selected from the group consisting of mixtures of laurate esters of sorbitol and sorbitol anhydrides; mixtures of stearate esters of sorbitol and sorbitol anhydrides; and mixtures of oleate esters of sorbitol and sorbitol anhydrides. Even more preferably said surfactant is selected from the group consisting of Polysorbate 20, which is a mixture of laurate esters of sorbitol and sorbitol anhydrides consisting predominantly of the monoester, condensed with about 20 moles of ethylene oxide; Polysorbate 60 which is a mixture of stearate esters of sorbitol and sorbitol anhydride, consisting predominantly of the monoester, condensed with about 20 moles of ethylene oxide; Polysorbate 80 which is a mixture of oleate esters of sorbitol and sorbitol anhydrides, consisting predominantly of the monoester, condensed with about 20 moles of ethylene oxide; and mixtures thereof. Most preferably, said surfactant is Polysorbate 60.

Other examples of ethoxylated surfactant include carboxylated alcohol ethoxylate, also known as ether carboxylate, with $R^8$ having from about 12 to about 16 carbon atoms and s being from about 5 to about 13; ethoxylated quaternary ammonium surfactants, such as PEG-5 cocomonium methosulfate, PEG-15 cocomonium chloride, PEG-15 oleammonium chloride and bis (polyethoxyethanol)tallow ammonium chloride.

Other suitable nonionic ethoxylated surfactants are ethoxylated alkyl amines derived from the condensation of ethylene oxide with hydrophobic alkyl amines, with $R^8$ having from about 8 to about 22 carbon atoms and s being from about 3 to about 30.

Also suitable nonionic ethoxylated surfactants for use herein are alkylpolysaccharides which are disclosed in U.S. Pat. No. 4,565,647, Llenado, issued Jan. 21, 1986, having a hydrophobic group containing from about 8 to about 30 carbon atoms, preferably from about 10 to about 16 carbon atoms and a polysaccharide, e.g., a polyglycoside, hydrophilic group containing from about 1.3 to about 10, preferably from about 1.3 to about 3, most preferably from about 1.3 to about 2.7 saccharide units. Any reducing saccharide containing 5 or 6 carbon atoms can be used, e.g., glucose, galactose and galactosyl moieties can be substituted for the glucosyl moieties. The intersaccharide bonds can be, e.g., between the one position of the additional saccharide units and the 2-, 3-, 4-, and/or 6- positions on the preceding saccharide units. The preferred alkylpolyglycosides have the formula

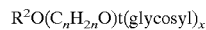

$$R^2O(C_nH_{2n}O)t(\text{glycosyl})_x$$

wherein $R^2$ is selected from the group consisting of alkyl, alkylphenyl, hydroxyalkyl, hydroxyalkylphenyl, and mixtures thereof in which the alkyl groups contain from 10 to 18, preferably from 12 to 14, carbon atoms; n is 2 or 3, preferably from about 1.3 to about 3, most preferably from about 1.3 to about 2.7. The glycosyl is preferably derived from glucose.

In one embodiment, the nonionic surfactants comprise polyhydroxy fatty acid amide surfactants of the formula:

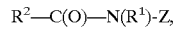

$$R^2\text{—}C(O)\text{—}N(R^1)\text{-}Z,$$

wherein $R^1$ is H, or $R^1$ is $C_{1\text{-}4}$ hydrocarbyl, 2-hydroxy ethyl, 2-hydroxy propyl or a mixture thereof, $R^2$ is $C_{5\text{-}31}$ hydrocarbyl, and Z is a polyhydroxyhydrocarbyl having a linear hydrocarbyl chain with at least 3 hydroxyls directly connected to the chain, or an alkoxylated derivative thereof. Preferably, $R^1$ is methyl, $R^2$ is a straight $C_{11\text{-}15}$ alkyl or $C_{16\text{-}18}$ alkyl or alkenyl chain such as coconut alkyl or mixtures thereof, and Z is derived from a reducing sugar such as glucose, fructose, maltose, lactose, in a reductive amination reaction.

In one embodiment, the anionic surfactants include alkyl alkoxylated sulfate surfactants hereof are water soluble salts or acids of the formula $RO(A)_m SO3M$ wherein R is an unsubstituted $C_{10}$–$C_{24}$ alkyl or hydroxyalkyl group having a $C_{10}$–$C_{24}$ alkyl component, preferably a $C_{12}$–$C_{20}$ alkyl or hydroxyalkyl, more preferably $C_{12}$–$C_{18}$ alkyl or hydroxyalkyl, A is an ethoxy or propoxy unit, m is greater than zero, typically between about 0.5 and about 6, more preferably between about 0.5 and about 3, and M is H or a cation which can be, for example, a metal cation (e.g., sodium, potassium, lithium, calcium, magnesium, etc.), ammonium or substituted-ammonium cation. Alkyl ethoxylated sulfates as well as alkyl propoxylated sulfates are contemplated herein.

These and other surfactants suitable for use in combination with the lipophilic fluid as adjuncts are well known in the art, being described in more detail in Kirk Othmer's Encyclopedia of Chemical Technology, 3rd Ed., Vol. 22, pp. 360–379, "Surfactants and Detersive Systems", incorporated by reference herein. Further suitable nonionic detergent surfactants are generally disclosed in U.S. Pat. No. 3,929,678, Laughlin et al., issued Dec. 30, 1975, at column 13, line 14 through column 16, line 6, incorporated herein by reference.

The non-silicone additive, when present in the fabric article treating compositions of the present invention, preferably comprises from about 0.01% to about 10%, more preferably from about 0.02% to about 5%, even more preferably from about 0.05% to about 2% by weight of the fabric article treating composition.

The non-silicone additive, when present in the consumable detergent compositions of the present invention, preferably comprises from about 1% to about 90%, more preferably from about 2% to about 75%, even more preferably from about 5% to about 60% by weight of the consumable detergent composition.

In one embodiment, the surfactant component comprises a non-silicone additive.

In another embodiment, the surfactant component does not comprise a non-silicone additive.

Polar Solvent

Compositions according to the present invention may further comprise a polar solvent. Non-limiting examples of polar solvents include: water, alcohols, glycols, polyglycols, ethers, carbonates, dibasic esters, ketones, other oxygenated solvents, and mixtures thereof. Further examples of alcohols include: C1–C126 alcohols, such as propanol, ethanol, isopropyl alcohol, etc . . . , benzyl alcohol, and diols such as 1,2-hexanediol. The Dowanol series by Dow Chemical are examples of glycols and polyglycols useful in the present invention, such as Dowanol TPM, TPnP, DPnB, DPnP, TPnB, PPh, DPM, DPMA, DB, and others. Further examples include propylene glycol, butylene glycol, polybutylene glycol and more hydrophobic glycols. Examples of carbonate solvents are ethylene, propylene and butylene carbonantes such as those available under the Jeffsol tradename. Polar solvents for the present invention can be further identified through their dispersive ($\delta_D$), polar ($\delta_P$) and hydrogen bonding ($\delta_H$) Hansen solubility parameters. Preferred polar solvents or polar solvent mixtures have fractional polar ($f_P$) and fractional hydrogen bonding ($f_H$) values of $f_P > 0.02$ and $f_H > 0.10$, where $f_P = \delta_P/(\delta_D + \delta_P + \delta_H)$ and $f_H = \delta_H/(\delta_D + \delta_P + \delta_H)$, more preferably $f_P > 0.05$ and $f_H > 0.20$, and most preferably $f_P > 0.07$ and $f_H > 0.30$.

In the detergent composition of the present invention, the levels of polar solvent can be from about 0 to about 70%, preferably 1 to 50%, even more preferably 1 to 30% by weight of the detergent composition.

Water, when present in the wash fluid fabric article treating compositions of the present invention, the wash fluid composition may comprise from about 0.001% to about 10%, more preferably from about 0.005% to about 5%, even more preferably from about 0.01% to about 1% by weight of the wash fluid fabric article treating composition.

Water, when present in the detergent compositions of the present invention, preferably comprises from about 1% to about 90%, more preferably from about 2% to about 75%, even more preferably from about 5% to about 40% by weight of the consumable detergent composition.

Processing Aids

Optionally, the compositions of the present invention may further comprise processing aids. Processing aids facilitate the formation of the fabric article treating compositions of the present invention, by maintaining the fluidity and/or homogeneity of the consumable detergent composition, and/or aiding in the dilution process. Processing aids suitable for the present invention are solvents, preferably solvents other than those described above, hydrotropes, and/or surfactants, preferably surfactants other than those described above with respect to the surfactant component. Particularly preferred processing aids are protic solvents such as aliphatic alcohols, diols, triols, etc. and nonionic surfactants such as ethoxylated fatty alcohols.

Processing aids, when present in the fabric article treating compositions of the present invention, preferably comprise from about 0.02% to about 10%, more preferably from about 0.05% to about 10%, even more preferably from about 0.1% to about 10% by weight of the fabric article treating composition.

Processing aids, when present in the consumable detergent compositions of the present invention, preferably comprise from about 1% to about 75%, more preferably from about 5% to about 50% by weight of the consumable detergent composition.

Cleaning Adjuncts

The compositions of the present invention may optionally further comprise one or more cleaning adjuncts. The optional cleaning adjuncts can vary widely and can be used at widely ranging levels. For example, detersive enzymes such as proteases, amylases, cellulases, lipases and the like as well as bleach catalysts including the macrocyclic types having manganese or similar transition metals all useful in laundry and cleaning products can be used herein at very low, or less commonly, higher levels. Cleaning adjuncts that are catalytic, for example enzymes, can be used in "forward" or "reverse" modes, a discovery independently useful from the fabric treating methods of the present invention. For example, a lipolase or other hydrolase may be used, optionally in the presence of alcohols as cleaning adjuncts, to convert fatty acids to esters, thereby increasing their solubility in the lipohilic fluid. This is a "reverse" operation, in contrast with the normal use of this hydrolase in water to convert a less water-soluble fatty ester to a more water-soluble material. In any event, any cleaning adjunct must be suitable for use in combination with a lipophilic fluid in accordance with the present invention.

Some suitable cleaning adjuncts include, but are not limited to, builders, surfactants, other than those described above with respect to the surfactant component, enzymes, bleach activators, bleach catalysts, bleach boosters, bleaches, alkalinity sources, antibacterial agents, colorants, perfumes, pro-perfumes, finishing aids, lime soap dispersants, odor control agents, odor neutralizers, polymeric dye transfer inhibiting agents, crystal growth inhibitors, photobleaches, heavy metal ion sequestrants, anti-tarnishing agents, anti-microbial agents, anti-oxidants, anti-redeposition agents, soil release polymers, electrolytes, pH modifiers, thickeners, abrasives, divalent or trivalent ions, metal ion salts, enzyme stabilizers, corrosion inhibitors, polyamines and/or their alkoxylates, suds stabilizing polymers, solvents, process aids, fabric softening agents, optical brighteners, hydrotropes, suds or foam suppressors, suds or foam boosters and mixtures thereof.

Suitable odor control agents, which may optionally be used as finishing agents, include agents include, cyclodextrins, odor neutralizers, odor blockers and mixtures thereof. Suitable odor neutralizers include aldehydes, flavanoids, metallic salts, water-soluble polymers, zeolites, activated carbon and mixtures thereof.

Perfumes and perfumery ingredients useful in the compositions of the present invention comprise a wide variety of natural and synthetic chemical ingredients, including, but not limited to, aldehydes, ketones, esters, and the like. Also included are various natural extracts and essences which can comprise complex mixtures of ingredients, such as orange oil, lemon oil, rose extract, lavender, musk, patchouli, balsamic essence, sandalwood oil, pine oil, cedar, and the like. Finished perfumes may comprise extremely complex mixtures of such ingredients. Pro-perfumes are also useful in the present invention. Such materials are those precursors or mixtures thereof capable of chemically reacting, e.g., by hydrolysis, to release a perfume, and are described in patents and/or published patent applications to Procter and Gamble, Firmenich, Givaudan and others.

Bleaches, especially oxygen bleaches, are another type of cleaning adjunct suitable for use in the compositions of the present invention. This is especially the case for the activated and catalyzed forms with such bleach activators as nonanoyloxybenzenesulfonate and/or any of its linear or branched higher or lower homologs, and/or tetraacetylethylenediamine and/or any of its derivatives or derivatives of phthaloylimidoperoxycaproic acid (PAP) or other imido- or amido-substituted bleach activators including the lactam types, or more generally any mixture of hydrophilic and/or hydrophobic bleach activators (especially acyl derivatives including those of the $C_6$–$C_{16}$ substituted oxybenzenesulfonates).

Also suitable are organic or inorganic peracids both including PAP and other than PAP. Suitable organic or inorganic peracids for use herein include, but are not limited to: percarboxylic acids and salts; percarbonic acids and salts; perimidic acids and salts; peroxymonosulfuric acids and salts; persulphates such as monopersulfate; peroxyacids such as diperoxydodecandioic acid (DPDA); magnesium peroxyphthalic acid; perlauric acid; perbenzoic and alkylperbenzoic acids; and mixtures thereof.

One class of suitable organic peroxycarboxylic acids has the general formula:

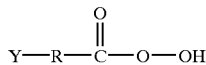

wherein R is an alkylene or substituted alkylene group containing from 1 to about 22 carbon atoms or a phenylene or substituted phenylene group, and Y is hydrogen, halogen, alkyl, aryl, —C(O)OH or —C(O)OOH.

Particularly preferred peracid compounds are those having the formula:

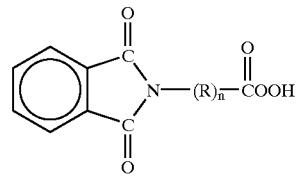

wherein R is $C_{1-4}$ alkyl and n is an integer of from 1 to 5. A particularly preferred peracid has the formula where R is $CH_2$ and n is 5 i.e., phthaloylamino peroxy caproic acid (PAP) as described in U.S. Pat. Nos. 5,487,818, 5,310,934, 5,246,620, 5,279,757 and 5,132,431. PAP is available from Ausimont SpA under the tradename Euroco.

Other cleaning adjuncts suitable for use in the compositions of the present invention include, but are not limited to, builders including the insoluble types such as zeolites including zeolites A, P and the so-called maximum aluminum P as well as the soluble types such as the phosphates and polyphosphates, any of the hydrous, water-soluble or water-insoluble silicates, 2,2'-oxydisuccinates, tartrate succinates, glycolates, NTA and many other ethercarboxylates or citrates; chelants including EDTA, S,S'-EDDS, DTPA and phosphonates; water-soluble polymers, copolymers and terpolymers; soil release polymers; optical brighteners; processing aids such as crisping agents and/fillers; anti-redeposition agents; hydrotropes, such as sodium, or calcium cumene sulfonate, potassium napthalenesulfonate, or the like, humectant; other perfumes or pro-perfumes; dyes; photobleaches; thickeners; simple salts; alkalis such as those based on sodium or potassium including the hydroxides, carbonates, bicarbonates and sulfates and the like; and combinations of one or more of these cleaning adjuncts.

Suitable finishing aids include, but are not limited to, finishing polymers; such as synthetic or natural polyacrylates or starch carboxymethyl cellulose or hydroxypropyl methyl cellulose, odor control agents, odor neutralizers, perfumes, properfumes, anti-static agents, fabric softeners, insect and/or moth repelling agents and mixtures thereof.

The finishing polymers can be natural, or synthetic, and can act by forming a film, and/or by providing adhesive properties to adhere the finishing polymers to the fabrics. By way of example, the compositions of the present invention can optionally use film-forming and/or adhesive polymer to impart shape retention to fabric, particularly clothing. By "adhesive" it is meant that when applied as a solution or a dispersion to a fiber surface and dried, the polymer can attach to the surface. The polymer can form a film on the surface, or when residing between two fibers and in contact with the two fibers, it can bond the two fibers together.

Nonlimiting examples of finishing polymers that are commercially available are: polyvinylpyrrolidone/dimethylaminoethyl methacrylate copolymer, such as Copolymer 958®, molecular weight of about 100,000 and Copolymer 937, molecular weight of about 1,000,000, available from GAF Chemicals Corporation; adipic acid/dimethylaminohydroxypropyl diethylenetriamine copolymer, such as Cartaretin F-4® and F-23, available from Sandoz Chemicals Corporation; methacryloyl ethyl betaine/methacrylates copolymer, such as Diaformer Z-SM®, available from Mitsubishi Chemicals Corporation; polyvinyl alcohol copolymer resin, such as Vinex 2019®, available from Air Products and Chemicals or Moweol®, available from Clariant; adipic acid/epoxypropyl diethylenetriamine copolymer, such as Delsette 101®, available from Hercules Incorporated; polyamine resins, such as Cypro 515®, available from Cytec Industries; polyquaternary amine resins, such as Kymene 557H®, available from Hercules Incorporated; and polyvinylpyrrolidone/acrylic acid, such as Sokalan EG 310®, available from BASF.

The cleaning adjunct may also be an antistatic agent. Any suitable well-known antistatic agents used in conventional laundering and dry cleaning are suitable for use in the compositions and methods of the present invention. Especially suitable as antistatic agents are the subset of fabric softeners which are known to provide antistatic benefits. For example those fabric softeners that have a fatty acyl group which has an iodine value of above 20, such as N,N-di (tallowoyl-oxy-ethyl)-N,N-dimethyl ammonium methylsulfate. However, it is to be understood that the term antistatic agent is not to be limited to just this subset of fabric softeners and includes all antistatic agents.

Preferred insect and moth repellent cleaning adjuncts useful in the compositions of the present invention are perfume ingredients, such as citronellol, citronellal, citral, linalool, cedar extract, geranium oil, sandalwood oil, 2-(diethylphenoxy)ethanol, 1-dodecene, etc. Other examples of insect and/or moth repellents useful in the compositions of the present invention are disclosed in U.S. Pat. Nos. 4,449,987; 4,693,890; 4,696,676; 4,933,371; 5,030,660; 5,196,200; and in "Semio Activity of Flavor and Fragrance Molecules on Various Insect Species", B. D. Mookherjee et al., published in *Bioactive Volatile Compounds from Plants*, ACS Symposium Series 525, R. Teranishi, R. G. Buttery, and H. Sugisawa, 1993, pp. 35–48, all of said patents and publications being incorporated herein by reference.

Examples of Fabric Article Treating Compositions

The following are non-limiting examples of fabric article treating compositions in accordance with the present invention.

TABLE 1

|  | A | B | C | D | E | F |
|---|---|---|---|---|---|---|
| Lipophilic Fluid | To 100% | To 100% | To 100% | To 100% | To 100% | To 100% |
| Surfactant Component(s) | 0.3% | 0.2% | 0.2% | 0.1% | 10% | 5% |
| Non-silicone Additive(s) | 0.4% | 0.15% | 0.2% | 0.2% | 5% | 1% |
| Polar Solvent(s) | — | — | 5% | 0.325% | 0.6% | 0.28% |

Examples of Consumable Detergent Compositions

The following are nonlimiting examples of consumable detergent compositions in accordance with the present invention:

TABLE 3

|  | A | B | C | D | E | F |
|---|---|---|---|---|---|---|
| Surfactant Component(s) | 33% | 82% | 50% | 16% | 35% | 15% |
| Non-silicone Additive(s) | 67% | 5% | 50% | 32% | 32% | 33% |
| Polar Solvent(s) | — | Balance | — | Balance | Balance | Balance |

Treated Fabric Article

A fabric article that has been treated in accordance a method of the present invention is also within the scope of the present invention. Preferably such a treated fabric article comprises an analytically detectable amount of at least one compound (e.g., an organosilicone) having a surface energy modifying effect but no antistatic effect; or an analytically detectable amount of at least one compound having a surface energy modifying and/or feel-modifying and/or comfort-modifying and/or aesthetic effect and at least one antistatic agent other than said at least one compound.

What is claimed is:

1. A fabric article treating composition comprising:
   a) a lipophilic fluid; and
   b) a siloxane-based surfactant capable of enhancing soil removal benefits of a lipophilic fluid and/or capable of suspending water in a lipophilic fluid, and end group of said siloxane-based surfactant being —$O_{1/2}SiH_2(OH)$ or —$O_{1/2}SiH_3$; and
   c) a non-silicone additive capable of further enhancing soil removal by the composition; and
   d) optionally, a polar solvent; and
   e) optionally, other cleaning adjuncts;
   wherein the fabric article treating composition is capable of suspending water in a lipophilic fluid.

2. The fabric article treating composition according to claim 1 wherein said lipophilic fluid comprises from about 70% to about 99.99% by weight of the fabric article treating composition.

3. The fabric article treating composition according to claim 1 wherein said surfactant component comprises from about 0.001% to about 10% by weight of the fabric article treating composition.

4. The fabric article treating composition according to claim 1 wherein said (b) surfactant component further comprises a non-silicone surfactant selected from the group consisting of anionic, cationic, nonionic, zwitterionic surfactants and mixtures, thereof.

5. The fabric article treating composition according to claim 4 wherein said non-silicone surfactant comprises an organosulfosuccinate.

6. The fabric article treating composition according to claim 4 wherein said non-silicone surfactant comprises a betaine.

7. The fabric article treating composition according to claim 4 wherein said non-silicone surfactant comprises an anionic surfactant.

8. The fabric article treating composition according to claim 1 wherein said siloxane-based surfactant comprises a polyether siloxane having the formula:

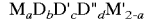

$$M_a D_b D'_c D''_d M'_{2-a}$$

wherein a is 0–2; b is 0–1000; c is 0–50; d is 0–50, provided that a+c+d is at least 1;

M is $R^1_{3-e}X_e SiO_{1/2}$ wherein $R^1$ is H, X is hydroxyl group, and e is 0 or 1;

M' is $R^2_3 SiO_{1/2}$ wherein $R^2$ is independently H, a monovalent hydrocarbon group, or $(CH_2)_f$—$(C6H4)_g$ O—$(C_2H_4O)_h$—$(C_3H_6O)_i$—$(C_kH_{2k}O)_j$—$R^3$, provided that at least one $R^2$ is $(CH_2)_f$—$(C6H4)_g$ O—$(C_2H_4 O)_h$—$(C_3H_6O)_i$—$(C_kH_{2k}O)_j$—$R^3$, wherein $R^3$ is independently H, a monovalent hydrocarbon group or an alkoxy group, f is 1–10, g is 0 or 1, h is 1–50, i is 0–50, j is 0–50, k is 4–8;

D is $R^4_2SiO_{2/2}$ wherein $R^4$ is independently H or a monovalent hydrocarbon group;

D' is $R^5_2SiO_{2/2}$ wherein $R^5$ is independently $R^2$ provided that at least one $R^5$ is $(CH_2)_f$—$(C6H4)_g$ O—$(C_2H_4O)_h$—$(C_3H_6O)_i$—$(C_kH_{2k}O)_j$—$R^3$, wherein $R^3$ is independently H, a monovalent hydrocarbon group or an alkoxy group, f is 1–10, g is 0 or 1, h is 1–50, i is 0–50, j is 0–50, k is 4–8; and D" is $R^6_2SiO_{2/2}$ wherein $R^6$ is independently H, a monovalent hydrocarbon group or $(CH_2)_l(C_6H_4)_m(A)_n$-[(L)$_O$-(A')$_p$-]$_q$-(L')$_r$Z(G)$_s$, wherein l is 1–10; m is 0 or 1; n is 0–5;

o is 0–3; p is 0 or 1; q is 0–10; r is 0–3; s is 0–3; $C_6H_4$ is unsubstituted or substituted with a $C_{1-10}$ alkyl or alkenyl; A and A' are each independently a linking moiety representing an ester, a keto, an ether, a thio, an amido, an amino, a $C_{1-4}$ fluoroalkyl, a $C_{1-4}$ fluoroalkenyl, a branched or straight chained polyalkylene oxide, a phosphate, a sulfonyl, a sulfate, an ammonium, and mixtures thereof; L and L' are each independently a $C_{1-30}$ straight chained or branched alkyl or alkenyl or an aryl which is unsubstituted or substituted; Z is a hydrogen, carboxylic acid, a hydroxy, a phosphato, a phosphate ester, a sulfonyl, a sulfonate, a sulfate, a branched or straight-chained polyalkylene oxide, a nitryl, a glyceryl, an aryl unsubstituted or substituted with a $C_{1-30}$alkyl or alkenyl, a carbohydrate unsubstituted or substituted with a $C_{1-10}$alkyl or alkenyl or an ammonium;

G is an anion or cation such as $H^+$, $Na^+$, $Li^+$, $K^+$, $NH_4^+$, $Ca^{+2}$, $Mg^{+2}$, $Cl^-$, $Br^-$, $I^-$, mesylate or tosylate.

9. The fabric article treating composition according to claim 5 wherein said organosulfosuccinate surfactant comprises a dialkylsulfosuccinate wherein the alkyl chains are from about C6 to about C20.

10. The fabric article treating composition according to claim 1 wherein said non-silicone additive (c) comprises a nitrogen-containing organic material comprising a quaternary surfactant.

11. The fabric article treating composition according to claim 10 wherein said quaternary surfactant comprises a hydrophobic quaternary compound having a total carbon number of between 20 and 50.

12. The fabric article treating composition according to claim 11 wherein the quaternary surfactant comprises Arquad 2C-75, Varisoft 222, Varisoft 110 and/or Bardac 22.

13. The fabric article treating composition according to claim 1 wherein said non-silicone additive (c) comprises a betaine and/or a zwitterionic surfactant.

14. The fabric article treating composition according to claim 1 wherein said non-silicone additive comprises from about 0.001% to about 10% by weight of the fabric article treating composition.

15. The fabric article treating composition according to claim 1 wherein said non-silicone additive (c) comprises a nitrogen-containing organic material.

16. The fabric article treating composition according to claim 15 wherein said nitrogen-containing organic material is selected from the group consisting of primary, secondary, tertiary amines, diamines, triamines, ethoxylated amines, amine oxides, amides, betaines, quaternary ammonium salts and mixtures thereof.

17. The fabric article treating composition according to claim 16 wherein said nitrogen-containing organic material comprises an alkyl amine.

18. The fabric article treating composition according to claim 17 wherein said nitrogen-containing organic material is selected from the group consisting of: dodecylamine, stearylamine, oleylamine and mixtures thereof.

19. The fabric article treating composition according to claim 1 wherein said polar solvent comprises water.

20. The fabric article treating composition according to claim 1 wherein said composition further comprises a cleaning adjunct selected from the group consisting of: builders, additional surfactants, emulsifying agents, enzymes, bleach activators, bleach catalysts, bleach boosters, bleaches, alkalinity sources, antibacterial agent, colorants, perfume, lime soap dispersants, odor control agents, odor neutralizers, polymeric dye transfer inhibiting agents, crystal growth inhibitors, photobleaches, heavy metal ion sequestrants, anti-tarnishing agents, anti-microbial agents, anti-oxidants, anti-redeposition agents, soil release polymers, electrolytes, pH modifiers, thickeners, abrasives, divalent ions, metal ion salts, enzyme stabilizers, corrosion inhibitors, diamines, suds stabilizing polymers, solvents, process aids, fabric softening agents or actives, sizing agents, optical brighteners, hydrotropes and mixtures thereof.

21. A fabric article treating composition comprising:
a) from about 70% to about 99.99% by weight of the fabric article treating composition of decamethylcyclopentasiloxane; and
b) from about 0.01% to about 10% by weight of the fabric article treating composition of a siloxane-based surfactant capable of enhancing soil removal benefits of a lipophilic fluid and/or capable of suspending water in a lipophilic fluid, one end group of said sidoxane-based surfactant being —$O_{1/2}SiH_2(OH)$ or —$O_{1/2}SiH_3$; and
c) from about 0.01% to about 10% by weight of the fabric article treating composition of a non-silicone additive capable of further enhancing soil removal by the composition; and
d) optionally, from about 0.001% to about 10% by weight of the fabric article treating composition of a polar solvent; and
e) optionally, from about 0.01% to about 10% by weight of the fabric article treating composition of other cleaning adjuncts;
wherein the composition is capable of suspending water in a lipophilic fluid.

22. A consumable detergent composition comprising:
a) a surfactant component capable of enhancing soil removal benefits of a lipophilic fluid and/or capable of suspending water in a lipophilic fluid; said surfactant component comprises a siloxane-based surfactant, an end group of said siloxane-based surfactant being —$O_{1/2}SiH_2(OH)$ or —$O_{1/2}SiH_3$; and
b) a non-silicone additive capable of further enhancing soil removal by the composition; and
c) optionally, a polar solvent; and
d) optionally, other cleaning adjuncts; and
e) optionally lipophilic fluid; and
f) optionally processing aids;
wherein the composition is capable of suspending water in a lipophilic fluid.

23. A detergent composition according to claim 22 wherein said surfactant component (a) comprises from about 1% to about 99% by weight of the detergent composition.

24. The detergent composition according to claim 23 wherein said surfactant component further comprises a surfactant selected from the group consisting of anionic surfactants, cationic surfactants, betaine or zwitterionic surfactants and mixtures thereof.

25. The detergent composition according to claim 22 wherein said composition has a flash point of greater than 100° F.

26. The detergent composition according to claim 22 wherein said composition has a flash point of greater than 140° F.

27. The detergent composition according to claim 22 wherein all of said composition additives do not co-distill with the lipophilic fluid or are water soluble at the level used in the fabric article treating composition.

28. The detergent composition according to claim 22 wherein all of said composition additives have boiling points that are at least 20 C. degrees above or below the lipophilic fluid.

29. The detergent composition according to claim 22 wherein said siloxane-based surfactant comprises a polyether siloxane having the formula:

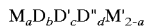

$M_a D_b D'_c D''_d M'_{2-a}$ wherein a is 0–2; b is 0–1000; c is 0–50; d is 0–50, provided that a+c+d is at least 1;

M is $R^1_{3-e}X_e SiO_{1/2}$ wherein $R^1$ is H, X is hydroxyl group, and e is 0 or 1;

M' is $R^2_3 SiO_{1/2}$ wherein $R^2$ is independently H, a monovalent hydrocarbon group, or $(CH_2)_f$—$(C6H4)_g$ O—$(C_2H_4O)_h$—$(C_3H_6O)_i$—$(C_kH_{2k}O)_j$—$R^3$, provided that at least one $R^2$ is $(CH_2)_f$—$(C6H4)_g$ O—$(C_2H_4O)_h$—$(C_3H_6O)_i$—$(C_kH_{2k}O)_j$—$R^3$, wherein $R^3$ is independently H, a monovalent hydrocarbon group or an alkoxy group, f is 1–10, g is 0 or 1, h is 1–50, i is 0–50, j is 0–50, k is 4–8;

D is $R^4_2 SiO_{2/2}$ wherein $R^4$ is independently H or a monovalent hydrocarbon group;

D' is $R^5_2 SiO_{2/2}$ wherein $R^5$ is independently $R^2$ provided that at least one $R^5$ is $(CH_2)_f$—$(C6H4)_g$ O—$(C_2H_4O)_h$—$(C_3H_6O)_i$—$(C_kH_{2k}O)_j$—$R^3$, wherein $R^3$ is independently H, a monovalent hydrocarbon group or an alkoxy group, f is 1–10, g is 0 or 1, h is 1–50, i is 0–50, j is 0–50, k is 4–8; and D'' is $R^6_2 SiO_{2/2}$ wherein $R^6$ is independently H, a monovalent hydrocarbon group or $(CH_2)_l(C_6H_4)_m (A)_n$-$[(L)_o$-$(A')_p$-$]_q$-$(L')_r Z(G)_s$, wherein l is 1–10; m is 0 or 1; n is 0–5;

o is 0–3; p is 0 or 1; q is 0–10; r is 0–3; s is 0–3; $C_6H_4$ is unsubstituted or substituted with a $C_{1-10}$ alkyl or alkenyl; A and A' are each independently a linking moiety representing an ester, a keto, an ether, a thio, an amido, an amino, a $C_{1-4}$ fluoroalkyl, a $C_{1-4}$ fluoroalkenyl, a branched or straight chained polyalkylene oxide, a phosphate, a sulfonyl, a sulfate, an ammonium, and mixtures thereof; L and L' are each independently a $C_{1-30}$ straight chained or branched alkyl or alkenyl or an aryl which is unsubstituted or substituted; Z is a hydrogen, carboxylic acid, a hydroxy, a phosphato, a phosphate ester, a sulfonyl, a sulfonate, a sulfate, a branched or straight-chained polyalkylene oxide, a nitryl, a glyceryl, an aryl unsubstituted or substituted with a $C_{1-30}$alkyl or alkenyl, a carbohydrate unsubstituted or substituted with a $C_{1-10}$alkyl or alkenyl or an ammonium;

G is an anion or cation such as $H^+$, $Na^+$, $Li^+$, $K^+$, $NH_4^+$, $Ca^{+2}$, $Mg^{+2}$, $Cl^-$, $Br^-$, $I^-$, mesylate or tosylate.

30. The detergent composition according to claim 22 wherein said surfactant component comprises an organosulfosuccinate surfactant.

31. The detergent composition according to claim 30 wherein said organosulfosuccinate surfactant is a dialkyl-sulfosuccinate wherein the alkyl chains are from about C6 to about C20.

32. The fabric article treating composition according to claim 22 wherein said non-silicone additive is a nitrogen-containing organic material comprising a quaternary surfactant.

33. The detergent composition according to claim 32 wherein said quaternary surfactant comprises a hydrophobic quaternary compound having a total carbon number of between 20 and 50.

34. The fabric article treating composition according to claim 33 wherein the quaternary surfactant comprises a dialkyldimethyl quaternary compound.

35. The detergent composition according to claim 34 wherein the dialkyldimethyl quaternary compound comprises Arquad 2C-75, Varisoft 222, Varisoft 110 and/or Bardac 22.

36. The detergent composition according to claim 22 wherein said non-silicone additive is a betaine or zwitterionic surfactant such as Schercotaine IAB, a sarcosinate or the acid thereof.

37. The detergent composition according to claim 22 wherein said non-silicone additive comprises from about 1% to about 99% by weight of the detergent composition.

38. The detergent composition according to claim 22 wherein said non-silicone additive comprises a nitrogen-containing organic material.

39. The detergent composition according to claim 38 wherein said nitrogen-containing organic material is selected from the group consisting of primary, secondary, tertiary amines, diamines, triamines, ethoxylated amines, amine oxides, amides, betaines, quaternary ammonium salts and mixtures thereof.

40. The detergent composition according to claim 38 wherein said nitrogen-containing organic material comprises an alkyl amine.

41. The detergent composition according to claim 38 wherein said nitrogen-containing organic material is selected from the group consisting of: dodecylamine, stearylamine, oleylamine and mixtures thereof.

42. The detergent composition according to claim 22 wherein said polar solvent comprises water, which comprises from about 1% to about 90% by weight of the detergent composition.

43. A consumable detergent composition comprising:
   a) from about 1% to about 99% by weight of the composition of a surfactant component capable of enhancing soil removal benefits of a lipophilic fluid and/or capable of suspending water in a lipophilic fluid, said surfactant component comprises a siloxane-based surfactant, an end group of said siloxane-based surfactant being —$O_{1/2}SiH_2(OH)$ or —$O_{1/2}SiH_3$; and
   b) from about 1% to about 99% by weight of the composition of a non-silicone additive capable of further enhancing soil removal by the composition; and
   c) optionally, from about 1% to about 98% by weight of the composition of water; and
   d) optionally, from about 1% to about 98% by weight of the composition of a processing aid; and
   e) optionally, from about 1% to about 98% by weight of the composition of lipophilic fluid;

wherein the composition is capable of suspending water in a lipophilic fluid.

44. A consumable detergent composition comprising:

a) from about 5% to about 75% by weight of the composition a siloxane-based surfactant component, an end group of said siloxane-based surfactant being —O$_{1/2}$SiH$_2$(OH) or —O$_{1/2}$SiH$_3$; and b) from about 5% to about 75% by weight of the composition of a nonionic surfactant; and c) optionally, from about 0.1% to about 25% by weight of the composition of a cationic surfactant; and d) optionally, from about 0.1% to about 25% by weight of the composition an anionic surfactant, and:

e) optionally, from about 0.1% to about 50% by weight of the composition of water.

45. A consumable detergent composition comprising:

a) from about 5% to about 75% by weight of the composition a siloxane-based surfactant component, an end group of said siloxane-based surfactant being —O$_{1/2}$SiH$_2$(OH) or —O$_{1/2}$SiH$_3$; and b) from about 5% to about 75% by weight of the composition of a nonionic surfactant; and c) from about 1% to about 25% by weight of the composition of a solvent selected from the group consisting of: ethanol, dipropylene glycol t-butylether and mixtures thereof;

d) optionally, from about 0.1% to about 25% by weight of the composition of a cationic surfactant; and e) optionally, from about 0.1% to about 25% by weight of the composition an anionic surfactant, and:

f) optionally, from about 0.1% to about 50% by weight of the composition of water.

46. A consumable detergent composition comprising:

a) from about 0.1% to about 10% by weight of the composition a siloxane-based surfactant component, an end group of said siloxane-based surfactant being —O$_{1/2}$SiH$_2$(OH) or —O$_{1/2}$SiH$_3$; and b) from about 0% to about 75% by weight of the composition of a nonionic surfactant; and c) from about 0.1% to about 75% by weight of the composition of a betaine or cationic surfactant; and d) optionally, from about 0.1% to about 25% by weight of the composition an anionic surfactant; and e) optionally, from about 1% to about 25% by weight of the composition of a solvent selected from group consisting of: ethanol, dipropylene glycol t-butylether and mixtures thereof;

f) optionally, from about 0.1% to about 50% by weight of the composition of water.

47. A consumable detergent composition comprising:

a) from about 5% to about 75% by weight of the composition a siloxane-based surfactant component, an end group of said siloxane-based surfactant being —O$_{1/2}$SiH$_2$(OH) or —O$_{1/2}$SiH$_3$; and b) from about 5% to about 75% by weight of the composition of a nonionic surfactant; and c) from about 0.1% to about 75% by weight of the composition of a betaine surfactant; and d) optionally, from about 0.1% to about 25% by weight of the composition an anionic surfactant; and e) optionally, from about 0.1% to about 25% by weight of the composition of a cationic surfactant; and f) optionally, from about 0.1% to about 50% by weight of the composition of water.

48. A consumable detergent composition according to claim 22 comprising a cosolvent selected from the group consisting of ethanol, glycol ethers and mixtures thereof.

49. A method for preparation of a fabric article treating composition from a consumable detergent composition comprising the step of mixing a consumable detergent composition according to claim 22 with a discrete lipophilic fluid to form the fabric article treating composition.

50. A method for laundering fabric articles in need of treatment comprising the steps of:

a) mixing a consumable detergent composition according to claim 22 with a discrete lipophilic fluid to form a fabric article treating composition; and b) contacting the fabric articles with the fabric article treating composition from step a), such that the fabric articles are treated.

51. A method for laundering fabric articles in need of treatment comprising the step of contacting the fabric articles with a consumable detergent composition according to claim 22 in the presence of a discrete lipophilic fluid.

52. A fabric article treated by the method according to claim 50.

53. A fabric article treated by the method according to claim 51.

54. A fabric article treating composition produced by the method according to claim 49.

* * * * *